(12) United States Patent
Loesch et al.

(10) Patent No.: US 8,173,757 B2
(45) Date of Patent: May 8, 2012

(54) PROCESS FOR PRODUCTION OF POLYMER POWDERS CONTAINING VINYLFORMAMIDE UNITS

(75) Inventors: Dennis Loesch, Altrip (DE); Volker Seidl, Mannheim (DE); Martin Ruebenacker, Altrip (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 838 days.

(21) Appl. No.: 12/090,366

(22) PCT Filed: Oct. 27, 2006

(86) PCT No.: PCT/EP2006/067866
§ 371 (c)(1),
(2), (4) Date: Apr. 16, 2008

(87) PCT Pub. No.: WO2007/054442
PCT Pub. Date: May 18, 2007

(65) Prior Publication Data
US 2008/0319150 A1 Dec. 25, 2008

(30) Foreign Application Priority Data

Nov. 8, 2005 (DE) .......................... 10 2005 053 559

(51) Int. Cl.
*C08F 20/00* (2006.01)

(52) U.S. Cl. .................................. 526/303.1; 526/307.1

(58) Field of Classification Search ............... 526/303.1, 526/307.1
See application file for complete search history.

(56) References Cited

U.S. PATENT DOCUMENTS

| 4,567,300 | A | * | 1/1986 | Murao et al. .................. 564/215 |
| 5,269,980 | A | | 12/1993 | Levendis et al. |
| 6,710,175 | B2 | * | 3/2004 | Anderson et al. ................ 536/45 |
| 7,084,200 | B2 | * | 8/2006 | Leduc et al. .................. 524/458 |
| 2002/0193546 | A1 | | 12/2002 | Freeman et al. |

FOREIGN PATENT DOCUMENTS

| DE | 0 071 050 | 2/1983 |
| DE | 0 220 603 | 5/1987 |
| DE | 40 07 311 | 9/1991 |
| DE | 103 40 253 | 3/2005 |
| DE | 10 2005 044 035 | 3/2007 |

* cited by examiner

*Primary Examiner* — Edward Cain
(74) *Attorney, Agent, or Firm* — Oblon, Spivak, McClelland, Maier & Neustadt, L.L.P.

(57) ABSTRACT

A process for producing a polymer powder comprising vinylformamide units by free radical polymerization of an aqueous solution of N-vinylformamide and if appropriate other monomers and drying the polymer which comprises an aqueous monomer solution comprising N-vinylformamide and at least one polymerization initiator being spray dispensed as an aerosol or dropletized at the top of a heatable tower-shaped reactor, then polymerizing the aerosol or droplets in an inert gas atmosphere to form a finely divided solid and discharging the finely divided polymer from the reactor.

24 Claims, No Drawings

PROCESS FOR PRODUCTION OF POLYMER POWDERS CONTAINING VINYLFORMAMIDE UNITS

This invention relates to a process for producing polymer powders comprising vinylformamide units by free radical polymerization of an aqueous solution of N-vinylformamide and if appropriate other monomers and drying the polymers.

Polymers comprising vinylformamide units are known. For instance, EP-A 0 071 050 describes linear basic polymers comprising 90 to 10 mol % of vinylamine units and 10 to 90 mol % of vinylformamide units. These polymers are produced by polymerizing N-vinylformamide by the solution polymerization process in water, the inverse suspension polymerization process, the water-in-oil emulsion polymerization process or the precipitation polymerization process and, in each case, subsequent partial detachment of formyl groups from the polyvinylformamides to form vinylamine units.

A process for inverse suspension polymerization of N-vinylformamide and hydrolysis of poly-N-vinylformamides having a water content of 6% to 90% by weight to form pulverulent products is known from DE-A 40 07 311.

U.S. Pat. No. 4,623,699 discloses a process for preparing polymer powders containing vinylamine units by treating pulverulent polymers containing N-vinylformamide with gaseous hydrogen halides at up to 200° C.

U.S. Pat. No. 4,769,427 discloses a continuous process for preparing finely divided gellike crosslinked polymers wherein a monomer mixture containing per 100 parts by weight of acrylic acid, methacrylic acid, the salts of these acids, acrylamide, methacrylamide or N-vinylpyrrolidone, if appropriate up to 30 parts by weight of water-soluble monomers such as N-vinylformamide, up to 20 parts by weight of water-insoluble monomers such as acrylic or methacrylic esters and 0.01 to 5 parts by weight of a crosslinker such as methylenebisacrylamide or trimethylolpropane triacrylate is polymerized in an extruder.

EP-A 0 220 603 discloses the polymerization of N-vinylformamide if appropriate together with at least one other monomer in supercritical carbon dioxide.

U.S. Pat. No. 5,269,980 discloses a process for producing polymer particles by spray polymerization wherein monodisperse droplets of a monomer solution are polymerized, and dried, in a hot gas stream. Styrene, methyl methacrylate, acrylic acid, vinyl acetate, divinylbenzene or mixtures thereof are specified as suitable monomers.

Prior DE application 10 2005 044 035 discloses a process for dropletizing liquids by means of a dropletizer plate whose underside has at least in part a contact angle of at least 60° with regard to the liquid to be dropletized. Such a dropletizer plate is used, for example, in a polymerization process for producing water-absorbing particles of polymer.

The above-described processes for producing pulverulent polymers comprising N-vinylformamide units are relatively costly and inconvenient. When pulverulent products are produced from aqueous solutions of poly-N-vinylformamides by evaporating the water the highly viscous aqueous solutions initially produced are difficult to handle. Threads form when such solutions are spray dried, so that the dried products initially have to be ground and then sieved.

The hitherto simplest method of recovering polymer powders comprising N-vinylformamide units consists in drying poly-N-vinylformamide suspensions or water-in-oil dispersions produced by inverse suspension polymerization for example. As with the spray-drying of aqueous polymer solutions, protective colloids and/or surfactants used as auxiliaries in the polymerization become deposited on the polymer powders as the polymer emulsions or dispersions are dried. The properties of the polymer powders are adversely affected as a result.

It is an object of the present invention to provide a further process for producing polymer powders comprising vinylformamide units.

We have found that this object is achieved in accordance with the present invention by a process for producing a polymer powder comprising vinylformamide units by free radical polymerization of an aqueous solution of N-vinylformamide and if appropriate other monomers and drying the polymer, which comprises an aqueous monomer solution comprising N-vinylformamide and at least one polymerization initiator being spray dispensed as an aerosol or dropletized at the top of a heatable tower-shaped reactor, then polymerizing the aerosol or droplets in an inert gas atmosphere to form a finely divided solid and discharging the finely divided polymer from the reactor.

A tower-shaped reactor refers to reactors, of any desired shape of footprint, where the length to diameter ratio is at least 3:1 and preferably at least 5:1. The ratio will usually be in the range from 3:1 to 7:1. The footprint area of the reactor may be, for example, circular, square, rectangular or octagonal. The reactor is preferably heatable and is equipped in its upper section, preferably at the top, with a conventional spraying device or with a dropletizer plate for the aqueous monomer solution. The reactor is supplied with an inert gas stream in its upper third for example. The temperature of the inert gas stream is preferably at least 100° C. and especially in the range from 110 to 300° C. The droplets formed in the reactor from the aqueous monomer solution are free-fallingly polymerized to a powder and at least partially dried in the process. The powder is discharged at the base of the reactor. The powder may if appropriate be aftertreated in a fluidized bed in order, for example, to effect a particle size enlargement through agglomeration or a supplementary polymerization. When the reactor has a very large length to diameter ratio, the fluidized bed may also be integrated in the reactor. When the reaction product traverses a fluidized bed, the fluidized bed is preferably situated in a separate heatable fluidized bed reactor. The material fluidized is preferably pulverulent poly-N-vinylformamide. The temperature in the fluidized bed will usually be equal to the temperature at which the polymerization takes place in the tower-shaped reactor. When a supplementary polymerization is to be carried out, the temperature can also be below or above the polymerization temperature, depending on the initiator used.

The inert gas is preferably nitrogen. However, it is also possible to use a noble gas as inert gas. In principle, any gas which does not react with the constituents of the monomer solution under the reaction conditions is useful as inert gas. The inert gas is preferably introduced into the reaction zone in the upper section of the reactor. The inert gas may be led through the reaction zone cocurrently with or countercurrently to the free-falling droplets of the monomer solution. Preferably, the carrier gas is after one pass at least partially, preferably at least 50% and more preferably at least 75% returned as cycle gas into the reaction space. Customarily, a portion of the carrier gas will be removed from the system after every pass, preferably up to 10%, more preferably up to 3% and most preferably up to 1%.

The gas velocity is preferably adjusted such that the flow in the reactor is laminar in that for example there are no convection eddies opposite to the general direction of flow. The velocity of the inert gas in the reactor is for example in the range from 0.02 to 1.5 m/s and preferably in the range from 0.05 to 0.4 m/s during the polymerization.

The process of the present invention is preferably carried out in a reactor equipped at the top with a dropletizer unit. The dropletizer unit is a plate having at least one drilled hole through which the liquid passes downwardly through the plate. The dropletizer plate or liquid is oscillated, the vibration generating a monodisperse chain of droplets on the underside of the dropletizer plate. The functioning of a dropletizer plate is explained in U.S. Pat. No. 5,269,980 at column 3 lines 37 to 54. The aqueous monomer solution is preferably dropletized by means of a dropletizer plate disposed at the top of the reactor.

The number of drilled holes is chosen according to the desired capacity and droplet size. The dropletizer plate customarily has at least one but preferably at least 10, more preferably at least 50 and customarily up to 10 000, preferably up to 5000 and more preferably up to 1000 drilled holes, the drilled holes typically forming a uniform distribution over the dropletizer plate. The drilled holes are usually arranged circularly in one or more rows. When the polymerization is initiated using UV irradiation, the drilled holes are arranged in staggered lines for example.

The diameter of the drilled holes is adapted to the desired droplet size. The diameter of the drilled holes is customarily in the range from 50 to 1000 μm, preferably at least 75 μm and more preferably at least 100 μm and customarily up to 1000 μm, preferably up to 600 μm and more preferably up to 300 μm. Droplet diameter is dependent on various factors. It is approximately equal to twice the diameter of the drilled holes in the dropletizer plate. Polymer particle diameter is also very substantially dependent on the solids content of the monomer solution.

It may be preferable to place the dropletizer plate on a carrier plate which likewise has drilled holes. The drilled holes in the carrier plate have a larger diameter than the drilled holes in the dropletizer plate and are arranged such that each drilled hole in the dropletizer plate is above a concentric drilled hole in the carrier plate. This arrangement allows a fast change of dropletizer plate, for example in order that droplets of a different size may be generated. Such a system of dropletizer plate and carrier plate shall be deemed a dropletizer plate for the purposes of this invention; i.e., the underside of the dropletizer plate/carrier plate system is the underside of the dropletizer plate.

The contact angle is a measure of the wetting behavior of a liquid, in particular water, with regard to a surface, and can be determined using customary methods, for example in accordance with ASTM D 5725. A low contact angle denotes good wetting and a high contact angle denotes poor wetting. The contact angle of the entire underside of the dropletizer plate is preferably at least 60° with regard to the liquid to be dropletized. But the dropletizer plate may also wholly consist of a material which has a contact angle of at least 60° with regard to the liquid to be dropletized. The contact angle with regard to the liquid to be dropletized is preferably at least 70° and especially at least 90°. The aqueous monomer solutions to be dropletized have the aforementioned contact angles.

The distance between the drilled holes is preferably in the range from 1 to 100 mm, more preferably in the range from 2 to 50 mm and especially in the range from 5 to 20 mm. The thickness of the dropletizer plate is so chosen that the dropletizer plate has sufficient mechanical stability, but is also able to oscillate sufficiently. Dropletizer plate thickness is preferably in the range from 0.1 to 2 mm, more preferably in the range from 0.2 to 1.5 mm and most preferably in the range from 0.5 to 1 mm, not including a possible carrier plate.

But it is also possible for the dropletizer plate to consist of a material having a lower contact angle with regard to the liquid to be dropletized, for example a steel having the German construction material code number of 1.4571, and be coated with a material having a large contact angle with regard to the liquid to be dropletized. Useful coatings include for example fluorous polymers, such as perfluoroalkoxyethylene, polytetrafluoroethylene, ethylene-chlorotrifluoroethylene copolymers, ethylene-tetrafluoroethylene copolymers and fluorinated polyethylene. A further method of increasing contact angle consists in chemically nickelizing a dropletizer plate made of iron, for example, and embedding Teflon. Owing to the poor wettability of the dropletizer plate, monodisperse droplets of narrow droplet size distribution are obtained.

Spray-dispensing the aqueous monomer solution by means of customary devices such as a two-material nozzle gives an aerosol having for example a particle diameter in the range from 20 to 200 μm and preferably in the range from 100 to 200 μm, whereas the droplets of the aqueous monomer solution which are obtained by dropletization have an average particle diameter in the range from 100 to 2000 μm. The particle sizes are weight average particle sizes as can be determined by dynamic light scattering. Pertinent methods will be familiar to one skilled in the art, for example from H. Wiese in D. Distler, Wässrige Polymerdispersionen, Wiley-VCH 1999, chapter 4.2.1, pages 40ff and references cited therein and also H. Auweter, D. Horn, J. Colloid Interf. Sci. 105 (1985) 399, D. Lilge, D. Horn, Colloid Polym. Sci. 269 (1991) 704 or H. Wiese, D. Horn, J. Chem. Phys. 94 (1991) 6429.

The aqueous monomer solution preferably comprises N-vinylformamide as sole monomer. The polymerization then produces homopolymers of N-vinylformamide in the form of powders having an average particle diameter in the range from 20 to 1000 μm for example. However, copolymers can also be produced by the process of the present invention. For this, the process of the present invention proceeds from an aqueous monomer solution comprising at least 50 mol % of N-vinylformamide and up to 50 mol % of at least one other water-soluble monomer. Water-soluble in the present context is to be understood as meaning that the monomer has a water solubility of >1 g/l (at 25° C. and 1013 mbar).

Examples of water-soluble monomers are for example ethylenically unsaturated $C_3$ to $C_5$-carboxylic acids such as acrylic acid, methacrylic acid, maleic acid, fumaric acid, itaconic acid and ethacrylic acid, sulfo-containing monomers such as vinylsulfonic acid, styrenesulfonic acid, allylsulfonic acid, methallylsulfonic acid, 2-acrylamido-2-methylpropanesulfonic acid and sulfoethyl acrylate, vinylphosphonic acid, acrylamide, methacrylamide, hydroxyalkyl acrylates and hydroxyalkyl methacrylates such as hydroxyethyl acrylate, hydroxyethyl methacrylate, hydroxypropyl acrylate, hydroxypropyl methacrylate, hydroxybutyl acrylate and hydroxybutyl methacrylate, basic acrylates and basic methacrylates such as dimethylaminoethyl acrylate, dimethylaminoethyl methacrylate, dimethylaminopropyl acrylate, dimethylaminopropyl methacrylate, diethylaminoethyl acrylate and diethylaminoethyl methacrylate, basic (meth)acrylamides such as dimethylaminoethylacrylamide, dimethylaminoethylmethacrylamide, diethylaminoethylacrylamide, diethylaminoethylmethacrylamide, dimethylaminopropylacrylamide and dimethylaminopropylmethacrylamide, N-vinylpyridine, N-vinylimidazole, 2-methylvinylimidazole and N-vinylcaprolactam.

The monomers comprising acid groups can be used in the polymerization in the form of the free acid groups and also in partially or fully base-neutralized form. Examples of useful bases are alkali metal, alkaline earth metal and ammonium bases. Preference is given to using aqueous sodium hydroxide solution, potassium hydroxide solution, ammonia, ethanolamine or triethanolamine as neutralizing agent.

Basic monomers can be used in the polymerization as free base, in partially or fully acid-neutralized form or in partially or fully quaternized form. Examples of acids are mineral acids such as hydrochloric acid, sulfuric acid or phosphoric acid and also organic acids such as formic acid, acetic acid, propionic acid, benzenesulfonic acid or toluenesulfonic acid. Examples of useful quaternizing agents are alkyl halides such as methyl chloride, ethyl chloride, hexyl chloride or benzyl chloride, dimethyl sulfate or diethyl sulfate.

Further examples of water-soluble monomers are methyl acrylate, methyl methacrylate, ethyl methacrylate, vinyl acetate, vinyl propionate and styrene.

The amounts of water-soluble monomers used in the polymerization with N-vinylformamide are for example in the range from 0 to 50 mol %, preferably in the range from 0.5 to 30 mol % and especially in the range from 1 to 20 mol %.

If appropriate, as well as at least one water-soluble monomer at least one water-insoluble monomer may be additionally used in the polymerization of N-vinylformamide, or N-vinylformamide may be polymerized together with at least one water-insoluble monomer. Water-insoluble is to be understood as meaning that the monomer has a water solubility of <1 g/l (at 25° C. and 1013 mbar). Examples of water-insoluble monomers are lauryl acrylate, lauryl methacrylate, palmityl acrylate, palmityl methacrylate, stearyl acrylate and stearyl methacrylate. The amount of water-insoluble monomer used in the polymerization is for example in the range from 0 to 20 mol % and usually in the range from 0.1 to 10 mol %. The amount of water-insoluble monomers which is used in a particular case depends on the solubility of the water-insoluble monomers in the aqueous monomer solution. The solubility of a water-insoluble monomers in the aqueous monomer solution is not the same as its solubility in water. Usually, a water-insoluble monomer will be more soluble in the monomer solution than in water. The water-insoluble monomers shall be soluble in the aqueous monomer solution.

The aqueous monomer solution may if appropriate comprise at least one crosslinker in addition to the abovementioned monomers, or N-vinylformamide and at least one crosslinker as monomers. Crosslinkers are compounds having at least two polymerizable groups which can be free-radically interpolymerized into the polymer network. Useful crosslinkers include for example ethylene glycol dimethacrylate, diethylene glycol diacrylate, allyl methacrylate, trimethylolpropane triacrylate, triallylamine, tetraallyloxyethane, as described in EP-A-0 530 438, di- and triacrylates as described in EP-A-0 547 847, EP-A-0 559 476, EP-A-0 632 068, WO 93/21237, WO 03/104299, WO 03/104300, WO 03/104301 and DE-A-103 31 450, mixed acrylates which, as well as acrylate groups, comprise further ethylenically unsaturated groups, as described in DE-A-103 31 456 and prior German application 10355401.7, or crosslinker mixtures as described for example in DE-A-195 43 368, DE-A-196 46 484, WO 90/15830 and WO 02/32962.

Useful crosslinkers include in particular N,N'-methylenebisacrylamide and N,N'-methylenebismethacrylamide, esters of unsaturated mono- or polycarboxylic acids of polyols, such as diacrylate or triacrylate, for example butanediol diacrylate, butanediol dimethacrylate, ethylene glycol diacrylate, ethylene glycol dimethacrylate and also trimethylolpropane triacrylate and allyl compounds, such as allyl (meth) acrylate, triallyl cyanurate, diallyl maleate, polyallyl esters, tetraallyloxyethane, triallylamine, tetraallylethylenediamine, allyl esters of phosphoric acid and also vinylphosphonic acid derivatives as described for example in EP-A-0 343 427.

Useful crosslinkers further include pentaerythritol diallyl ether, pentaerythritol triallyl ether, pentaerythritol tetraallyl ether, polyethylene glycol diallyl ether, ethylene glycol diallyl ether, glycerol diallyl ether, glycerol triallyl ether, polyallyl ethers based on sorbitol, and also ethoxylated variants thereof. The process of the present invention may utilize di(meth)acrylates of polyethylene glycols, the polyethylene glycol used having a molecular weight between 300 and 1000.

However, particularly advantageous crosslinkers are di- and triacrylates of 3- to 15-tuply ethoxylated glycerol, of 3- to 15-tuply ethoxylated trimethylolpropane, of 3- to 15-tuply ethoxylated trimethylolethane, especially di- and triacrylates of 2- to 6-tuply ethoxylated glycerol or of 2- to 6-tuply ethoxylated trimethylolpropane, of 3-tuply propoxylated glycerol, of 3-tuply propoxylated trimethylolpropane, and also of 3-tuply mixed ethoxylated or propoxylated glycerol, of 3-tuply mixed ethoxylated or propoxylated trimethylolpropane, of 15-tuply ethoxylated glycerol, of 15-tuply ethoxylated trimethylolpropane, of 40-tuply ethoxylated glycerol, of 40-tuply ethoxylated trimethylolethane and also of 40-tuply ethoxylated trimethylolpropane.

Very particularly preferred for use as crosslinkers are diacrylated, dimethacrylated, triacrylated or trimethacrylated multiply ethoxylated and/or propoxylated glycerols as described for example in WO 03/104301. Di- and/or triacrylates of 3- to 10-tuply ethoxylated glycerol are particularly advantageous. Very particular preference is given to di- or triacrylates of 1- to 5-tuply ethoxylated and/or propoxylated glycerol. The triacrylates of 3- to 5-tuply ethoxylated and/or propoxylated glycerol are most preferred. These are notable for particularly low residual levels (typically below 10 weight ppm) in the polymer.

The amount of crosslinker, if used in the polymerization, is preferably at least 0.001 mol %, especially at least 0.01 mol % and most preferably at least 0.1 mol %, and preferably up to 10 mol %, especially up to 5 mol % and most preferably up to 2 mol %, all based on total monomers used in the polymerization.

The concentration of monomers in the aqueous monomer solution is for example in the range from 1% to 80% by weight, preferably in the range from 5% to 70% by weight and is usually in the range from 10% to 60% by weight. In a preferred embodiment of the process of the present invention, the pH of the aqueous monomer solution is adjusted with a phosphate buffer to a pH in the range from 5 to 7.

The monomers are polymerized in the presence of initiators. The initiators are preferably added to the monomer solution, especially shortly before the spray-dispensing or the dropletizing of the monomer solution. When an initiator is to be added to the monomer solution, care should be taken to ensure that the temperature of the monomer solution is below 30° C. and especially below 20° C. When initiators are used that start the polymerization at a temperature as low as 35° C. for example, it is advisable to cool the monomer solution to a temperature of below 10° C., for example to 0-10° C., and to ensure by means of careful temperature policing of the aqueous monomer solution that no premature polymerization occurs.

The initiators are used in customary amounts, for example in amounts from 0.001% to 5% by weight and preferably from 0.01% to 1% by weight, based on the monomers to be polymerized.

Useful initiators include all compounds which disintegrate into free radicals under the polymerization conditions, examples being peroxides, hydroperoxides, hydrogen peroxide, persulfates, azo compounds and redox initiators. Preference is given to the use of water-soluble initiators. In some cases it is advantageous to use mixtures of various initiators, examples being mixtures of hydrogen peroxide and sodium or potassium peroxodisulfate. Mixtures of hydrogen peroxide and sodium peroxodisulfate can be used in any proportion. Useful redox initiators include for example combinations of an oxidizing component such as tert-butyl peroxide, di-tert-butyl peroxide, tert-butyl hydroperoxide or hydrogen peroxide and of a reducing component such as ascorbic acid, sodium methylsulfinate, sodium bisulfite and/or iron(II) salts such as iron(II) ammoniumsulfate. Examples of azo initiators are azobisisobutyronitrile, 2,2'-azobis(2,4-dimethylnitrile), 2,2'-azobis-N,N'-dimethyleneisobutyramidine dihydrochloride, 2,2'-azobis-2-amidinopropane dihydrochloride, 2,2'azobis-N,N'-dimethyleneisobutyraniline, 4,4'-azobis-4-cyanopentanecarboxylic acid and 2-carbamoylazoisobutyronitrile.

To modify the properties of the polymers, the aqueous monomer solution may further comprise a polymerization regulator. Examples of polymerization regulators are organic compounds comprising sulfur in bound form, such as dodecyl mercaptan, thiodiglycol, ethylthioethanol, di-n-butyl sulfide, di-n-octyl sulfide, diphenyl sulfide, diisopropyl disulfide, 2-mercaptoethanol, 1,3-mercaptopropanol, 3-mercaptopropane-1,2-diol, 1,4-mercaptobutanol, thioglycolic acid, 3-mercaptopropionic acid, mercaptosuccinic acid, thioacetic acid and thiourea, aldehydes such as formaldehyde, acetaldehyde and propionaldehyde, organic acids such as formic acid, sodium formate or ammonium formate, alcohols such as, in particular, isopropanol and also phosphorus compounds such as sodium hypophosphite. When a regulator is used in the polymerization, the amount used in a particular case will be for example in the range from 0.01% to 5% by weight and preferably in the range from 0.1% to 1% by weight, all based on the monomers used in the polymerization. Polymerization regulators and crosslinkers can be used together in the polymerization.

The temperature in the reaction space is preferably in the range from 70 to 250° C., more preferably in the range from 100 to 190° C. and most preferably in the range from 110 to 150° C. The polymerization may be carried out under superatmospheric pressure, for example at pressures up to 20 bar, or under reduced pressure, down to 50 mbar. For simplicity, it is preferable to polymerize at ambient pressure.

The polymerization rate and the drying rate typically have different temperature dependencies. This can mean, for example, that the spray-dispensed droplets dry before the desired conversion has been achieved. It is therefore advantageous to influence the reaction rate and the drying rate separately.

The drying rate can be influenced via the relative humidity of the inert gas. The relative humidity of the inert gas is generally less than 90%, preferably less than 60% and more preferably less than 30%. Relative humidity here refers to the quotient of water vapor partial pressure and maximum water vapor partial pressure (saturation) at a given temperature multiplied by 100%.

The polymerization rate can be controlled through the identity and amount of the initiator system used. The carrier gas is preheated, advantageously outside the reactor, to a temperature of 300° C., preferably to the reaction temperature of 70 to 250° C., usually 100 to 190° C. and especially to 110 to 150° C. The use of azo compounds or redox initiators as initiators is advantageous for directing the rate of polymerization. The starting characteristics of the polymerization are better directable with azo compounds or redox initiators via the choice of initiator, initiator concentration and reaction temperature than with pure peroxide initiators for example.

Photoinitiators are particularly advantageous. On using photoinitiators which are likewise added to the aqueous monomer solution, the drying rate can be controlled to the desired value via the temperature without thereby significantly influencing the free-radical formation process at the same time. The photopolymerization is advantageously started by UV lamps in the upper region of the reactor in the vicinity of the dropletizer plate.

The reaction offgas, i.e., the carrier gas leaving the reaction space, can be cooled down in a heat exchanger for example. Suitable heat exchangers are direct heat exchangers, such as scrubbers, and indirect heat exchangers, such as condensers. Water and unconverted monomer condense in the process. Thereafter, the reaction offgas can be at least partially reheated and returned into the reactor as cycle gas. Preferably, the cycle gas is cooled down such that the cooled cycle gas has the water vapor fraction desired for the reaction. A portion of the reaction offgas can be removed from the system and replaced by fresh carrier gas, in which case unconverted monomers comprised in the reaction offgas can be separated off and recycled. Particular preference is given to an integrated energy system whereby a portion of the heat rejected in the cooling of the offgas is used to heat up the cycle gas.

The reactors can be trace heated. Any trace heating is preferably adjusted such that the wall temperature is not less than 5° C. above reactor internal temperature and condensation at reactor walls is reliably avoided.

The polymer particles obtained may subsequently be dried and/or subjected to a supplementary polymerization to remove residual monomers or to a postcrosslinking operation. The average particle size of the polymers comprising N-vinylformamide units is for example in the range from 100 to 1000 µm and preferably in the range from 300 to 700 µm. If desired, the pulverulent polymer may be agglomerated in a fluidized bed following its production.

The polymers comprising N-vinylformamide units and obtainable by the process of the present invention can be modified by the known methods of the prior art in a polymer-analogous reaction through elimination of formyl groups from the interpolymerized vinylformamide units to form vinylamine units. For example, pulverulent polymers comprising N-vinylformamide units and having a water content of not more than 5% by weight may be treated with gaseous hydrogen chloride (cf. U.S. Pat. No. 4,623,699), or suspensions of such polymers, having a water content of at least 6% to 90% by weight, may be hydrolyzed by means of acids or bases (cf. DE-A 40 07 311). The hydrolysis takes place in the temperature range from 30 to 150° C. for example. Depending on the condition of hydrolysis, polymers are obtained whose N-vinylformamide units are 1% to almost 100% and usually 5% to 95% transformed into vinylamine units.

The polymers comprising vinylformamide units and the polymers comprising vinylamine units and obtainable from the polymers comprising vinylformamide units by elimination of formyl groups are added to papermaking stock for example. High molecular weight polymers comprising vinylformamide units and vinylamine units and having a molar mass of more then 1 million act as flocculation, dewatering and retention aids in papermaking. Polymers having molar masses of more than 100 000 up to 1 million are used as strength agents for paper, while low molecular weight polymers, especially polymers comprising vinylamine units, are fixatives for contraries and are used in particular in papermaking from wastepaper.

The percentages reported in the examples are by weight. The K value of the polymers was measured after H. Fikentscher, Cellulose-Chemie, volume 13, 58 to 64 and 71 to 74 (1932) at a polymer concentration of 2% by weight in completely ion-free water at 25° C.

EXAMPLE 1

The reactor used was a heatable spraying tower having a circular cross section with a diameter of 2 m and a height of 15 m. At the top the reactor was fitted with a dropletizer plate having 30 drilled holes 200 µm in diameter. The reactor was inertized with nitrogen and heated to an internal temperature of 150° C. Nitrogen was passed into the upper section of the reactor at a gas velocity of 0.1 m/s and a temperature of 150° C. Cocurrently with the nitrogen stream, an aqueous monomer solution prepared by mixing 3500 g of water, 23 g of 75% phosphoric acid, 34 g of 25% aqueous sodium hydroxide solution, 2000 g of N-vinylformamide (99%) and 10 g of V44 Azostarter 2,2'-azobis-2-2-imidazolin-2-ylpropane dihydrochloride was dropletized by means of the dropletizer plate described above. Per hour, 10 kg of the aqueous monomer solution were dropletized and polymerized. The polymerization of the N-vinylformamide took place in the individual droplets of the monomer solution at a gas temperature of 150° C. A white polymer powder having a residual moisture content of 12% and an average particle size of 390 µm was discharged at the base of the reactor. The polymer had a K value of 30.

EXAMPLE 2

Example 1 was repeated except that the aqueous monomer solution was spray dispensed through nozzles having a bore of 0.4 mm to obtain a white polymer having a residual moisture content of 9%, an average particle size of 90 µm and a K value of 20.

EXAMPLE 3

Example 1 was repeated except that the aqueous monomer solution dropletized comprised just 2 g of Azostarter azo initiator instead of 10 g to obtain a white powder having a residual moisture content of 9%, an average particle size of 400 µm and a K value of 70.

We claim:

1. A process for producing a polymer powder comprising vinylformamide units by free radical polymerization of an aqueous solution of N-vinylformamide and, optionally, other monomers and drying the polymer, which comprises an aqueous monomer solution comprising N-vinylformamide and at least one polymerization initiator being spray dispensed as an aerosol or dropletized at the top of a heatable tower-shaped reactor, then polymerizing the aerosol or droplets in an inert gas atmosphere to form a finely divided solid and discharging the finely divided polymer from the reactor,
   wherein the aqueous monomer solution is dropletized by means of a dropletizer plate disposed at the top of the reactor, and
   wherein the dropletizer plate is coated with or consists of a fluorous polymer.

2. A process for producing a polymer powder comprising vinylformamide units by free radical polymerization of an aqueous solution of N-vinylformamide and, optionally, other monomers and drying the polymer, which comprises an aqueous monomer solution comprising N-vinylformamide and at least one polymerization initiator being spray dispensed as an aerosol or dropletized at the top of a heatable tower-shaped reactor, then polymerizing the aerosol or droplets in an inert gas atmosphere to form a finely divided solid and discharging the finely divided polymer from the reactor,
   wherein the finely divided polymer is subsequently agglomerated in a fluidized bed.

3. The process according to claim 1, wherein the reactor is fed in its upper third with an inert gas stream having a temperature of at least 100° C.

4. The process according to claim 1, wherein the temperature of the inert gas stream is in the range from 120 to 300° C.

5. The process according to claim 1, wherein the dropletizer plate has drilled holes having a diameter in the range from 50 to 1000 µm.

6. The process according to claim 1, wherein the droplets of the aerosol formed by spray dispensing the aqueous monomer solution have a particle diameter in the range from 20 to 200 µm.

7. The process according to claim 1, wherein the droplets of the aqueous monomer solution which are formed by dropletization have an average particle diameter in the range from 100 to 2000 µm.

8. The process according to claim 1, wherein the aqueous monomer solution comprises N-vinylformamide as sole monomer.

9. The process according to claim 1, wherein the aqueous monomer solution comprises at least 50 mol % of N-vinylformamide and up to 50 mol % of at least one other water-soluble monomer.

10. The process according to claim 1, wherein the aqueous monomer solution comprises 0.001 to 10 mol % of at least one crosslinker having at least two double bonds in the molecule.

11. The process according to claim 1, wherein the aqueous monomer solution is adjusted with a phosphate buffer to a pH in the range from 5 to 7.

12. The process according to claim 1, wherein the aqueous monomer solution further comprises a polymerization regulator.

13. The process according to claim 2, wherein the reactor is fed in its upper third with an inert gas stream having a temperature of at least 100° C.

14. The process according to claim 2, wherein the temperature of the inert gas stream is in the range from 120 to 300° C.

15. The process according to claim 2, wherein the aqueous monomer solution is dropletized by means of a dropletizer plate disposed at the top of the reactor.

16. The process according to claim 15, wherein the dropletizer plate has drilled holes having a diameter in the range from 50 to 1000 µm.

17. The process according to claim 15, wherein the dropletizer plate is coated with or consists of a fluorous polymer.

18. The process according to claim 2, wherein the droplets of the aerosol formed by spray dispensing the aqueous monomer solution have a particle diameter in the range from 20 to 200 µm.

19. The process according to claim 2, wherein the droplets of the aqueous monomer solution which are formed by dropletization have an average particle diameter in the range from 100 to 2000 µm.

20. The process according to claim 2, wherein the aqueous monomer solution comprises N-vinylformamide as sole monomer.

21. The process according to claim 2, wherein the aqueous monomer solution comprises at least 50 mol % of N-vinylformamide and up to 50 mol % of at least one other water-soluble monomer.

22. The process according to claim 2, wherein the aqueous monomer solution comprises 0.001 to 10 mol % of at least one crosslinker having at least two double bonds in the molecule.

23. The process according to claim 2, wherein the aqueous monomer solution is adjusted with a phosphate buffer to a pH in the range from 5 to 7.

24. The process according to claim 2, wherein the aqueous monomer solution further comprises a polymerization regulator.

* * * * *